United States Patent [19]

Kuwano

[11] Patent Number: 4,897,633
[45] Date of Patent: Jan. 30, 1990

[54] LIGHTING DEVICE FOR ILLUMINATING SWITCH ARRANGEMENT ON MOTOR VEHICLE STEERING WHEELS

[75] Inventor: Fumiyoshi Kuwano, Kanagawa, Japan

[73] Assignee: Nissan Motor Company, Limited, Yokohama, Japan

[21] Appl. No.: 123,273

[22] Filed: Nov. 19, 1987

[30] Foreign Application Priority Data

Nov. 22, 1986 [JP] Japan .................. 61-279512

[51] Int. Cl.⁴ ............................... B60Q 1/00
[52] U.S. Cl. .................... 340/458; 307/10.8; 200/313; 74/484 H
[58] Field of Search .............. 340/52 R, 81 R, 642, 340/660–664, 507, 438, 458; 307/10 R, 10 LS, 150, 10.8; 116/31, 279, DIG. 28, DIG. 35, DIG. 36; 200/61.54–61.57, 310.313, 314.DIG. 39; 74/484 R, 484 H, 485, 486, 487; 439/131; 361/187–189; 362/36

[56] References Cited

U.S. PATENT DOCUMENTS

| | | | |
|---|---|---|---|
| 3,852,733 | 12/1974 | Sakurai | 340/642 |
| 4,453,088 | 6/1984 | Moore | 307/10 R |
| 4,464,933 | 8/1984 | Santis | 74/484 R |
| 4,578,592 | 3/1986 | Nakazawa et al. | 200/61.54 |
| 4,638,131 | 1/1987 | Kidd et al. | 200/61.54 |
| 4,658,150 | 4/1987 | Mizuno et al. | 307/10 R |
| 4,701,629 | 10/1987 | Citroën | 200/61.54 |
| 4,728,861 | 3/1988 | Kurihara et al. | 340/507 |
| 4,729,254 | 3/1988 | Nogami et al. | 74/484 R |
| 4,760,218 | 7/1988 | Gutman | 200/61.54 |

FOREIGN PATENT DOCUMENTS 2036434 6/1980 United Kingdom ............. 200/61.54

*Primary Examiner*—Herbert Goldstein
*Assistant Examiner*—Jill D. Jackson
*Attorney, Agent, or Firm*—Foley & Lardner, Schwartz, Jeffery, Schwaab, Mack, Blumenthal & Evans

[57] ABSTRACT

A lighting device for illuminating operation switches installed on a steering wheel inlcudes a light-emitting diode and an instrument light. The light-emitting diode is turned on by means of a constant-voltage generator which is connected to a power source via a light switch to apply voltage that is less than a predetermined value to said light-emitting diode via a slip ring in response to turning ON of the light switch. The instrument light is connected to the power source via the light switch and is turned on in response to turning ON of the light switch.

2 Claims, 1 Drawing Sheet

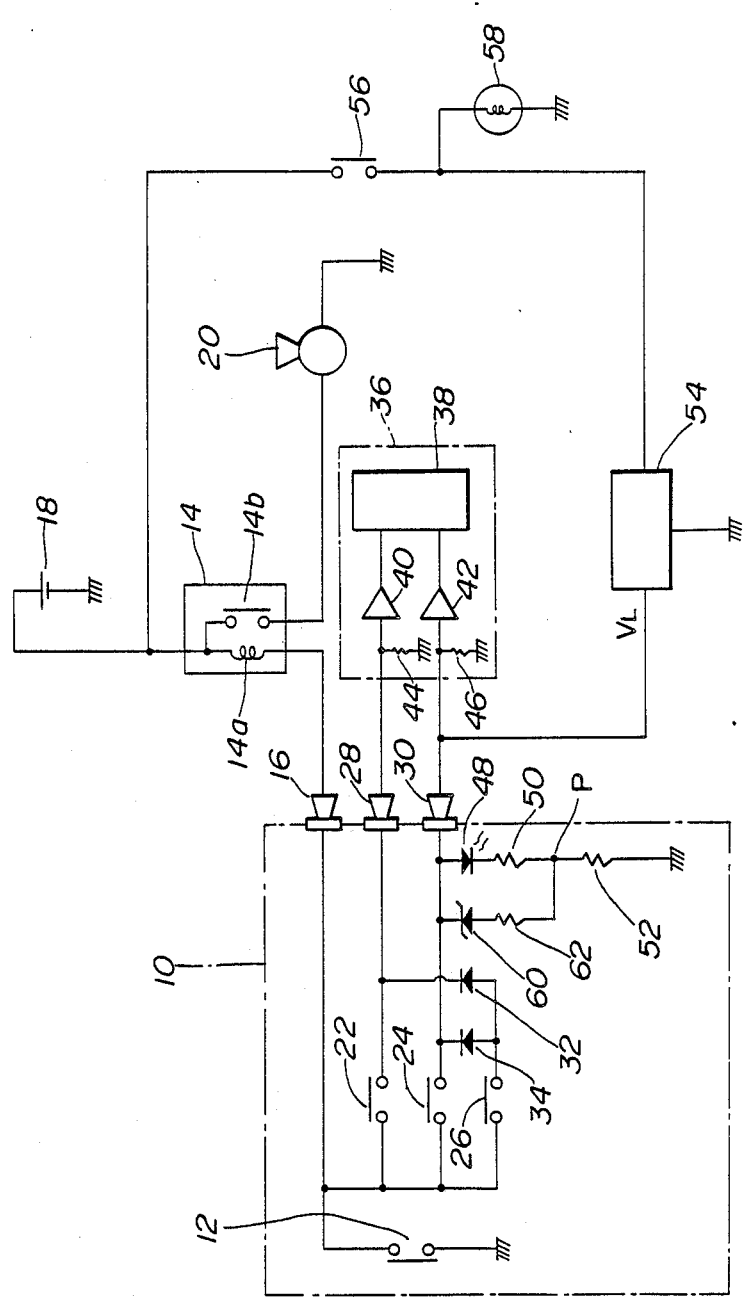

LIGHTING DEVICE FOR ILLUMINATING SWITCH ARRANGEMENT ON MOTOR VEHICLE STEERING WHEELS

BACKGROUND OF THE INVENTION 1. (Field of the Invention)

The present invention relates to a lighting device for lighting a switch arrangement mounted on a steering wheel pad, which can function as a horn switch, on an automotive steering wheel. More specifically, the invention relates to a lighting device which can light a plurality of operation switches for controlling electrical devices other than the horn.

2. (Description of the Prior Art)

In some vehicles, as is well known, a plurality of operation switches other than a horn switch are mounted on a steering wheel pad for controlling an electrical device, such as cruise control switches, audio control switches and so forth. In such vehicles, it is convenient for operating these operation switches at night if a lighting device for illuminating the operation switches is provided thereon. However, in cases where these operation switches are connected to the electrical device via slip rings, it is usually required to provide an additional slip ring connected to a circuit which causes a lighting source to be turned on in order to provide such a lighting device. In practice, it is difficult to provide any additional slip rings since there is not sufficient space on the steering wheel pad in which the slip rings are installed.

SUMMARY OF THE INVENTION

It is therefore a principal object of the present invention to eliminate the aforementioned disadvantages and to provide a lighting device for illuminating operation switches mounted on a steering wheel pad.

It is another object of the invention to provide a lighting device for illuminating operation switches mounted on a steering wheel pad without providing any additional slip rings in cases where the operation switches are connected to an electric device via slip rings.

In order to accomplish the aforementioned and other specific objects, the lighting device according to the present invention includes a light-emitting diode and an instrument light for illuminating operation switches installed on a steering wheel. The light-emitting diode is turned on by means of a constant-voltage generator which is connected to a power source via a light switch to apply voltage that is less than a predetermined value to the light-emitting diode in response to turning ON of the light switch. The instrument light is connected to the power source via the light switch and is turned on in response to turning ON of the light switch.

According to one aspect of the present invention, the lighting device comprises:

a power source;

first switching unit, in communication with the power source, for controlling an electric device;

first unit, in communication with the first switching unit, for outputting a signal to the electric device to allow the latter to operate when voltage not less than a predetermined value is applied thereto in response to turning ON of the first switching unit;

lighting unit for illuminating the first switching unit;

second unit, in communication with the lighting unit, for applying voltage less than a predetermined value to the lighting unit to allow the latter to be turned ON when the second unit is in communication with the power source; and second switching unit, connected to the power source and the second unit, for establishing the communication between the power source and the second unit in response to turning ON thereof.

The first switching unit and the lighting unit are preferably installed on a steering wheel. The lighting unit may comprise a light-emitting diode.

According to another aspect of the present invention, the lighting device comprises:

a power source;

first switching unit, connected to the power source via a first slip ring, for controlling an electric device;

first unit, connected to the first switching unit via a second slip ring, for outputting a signal to the electrical device to allow the latter to operate when voltage not less than a predetermined value is applied thereto in response to turning ON of the first switching unit;

lighting unit for illuminating on the first switching unit;

second unit, connected to the lighting unit via the second slip ring, for applying voltage that is less than a predetermined value to the lighting unit to allow the latter to be turned ON when the second unit is in communication with the power source; and second switching unit, connected to the power source and the second unit, for establishing the communication between the power source and the second unit in response to turning ON thereof.

The first switching unit and the lighting unit may be connected to one side of the second slip ring and wherein the first and second unit are connected to the other side of the second slip ring. Preferably, the first switching unit and the lighting unit are installed on a steering wheel, and first and second unit are installed outside the steering wheel to be connected to the switching unit and the lighting unit via the second slip ring. The first switching unit may comprise an operation switch for operating an electrical device which controls vehicular speed at a predetermined value. The lighting unit may comprise a light-emitting diode installed on the steering wheel. In this case, the anode electrode of the light-emitting diode is preferably connected to the first switching unit and the second slip ring, and the cathode electrode thereof is preferably connected to ground via first and second resistors which are connected in series. The light-emitting diode is connected, in parallel, to a Zener diode which is connected to a third resistor in series and which is turned ON in response to turning ON of the first switching unit so as to prevent voltage from being applied to the light-emitting diode via the first switching unit. The cathode electrode of the Zener diode is preferably connected to the first switching unit and the second slip ring, and the anode electrode thereof is preferably connected, via the third resistor, to the connecting portion between the first and second resistors. The lighting device may also include an instrument light which is connected to the power source via the second switching unit to illuminate the first switching unit in response to turning ON of the second switching unit.

According to the present invention, the lighting device may further comprise:

a horn relay including a relay coil and a normally open contact which is closed when electricity passes through the relay coil, one end of each of the relay coil and the normally open contact being connected to the power source;

a horn switch, one end of which is connected to ground and the other end of which is connected to the other end of the relay coil via the first slip ring; and a horn which operates in response to turning ON of the horn switch, and one end of which is connected to ground and the other end of which is connected to the other end of the normally open contact.

According to the present invention, the lighting device may further comprise a fourth resistor, one end of which is connected to ground and the other end of which is connected to a portion between the second slip ring and the first unit. In this case, the fourth resistor preferably has large resistance so as not to cause the horn to become active in response to turning ON of the first switching unit.

BRIEF DESCRIPTION OF THE DRAWING

The drawing is a circuit diagram of the preferred embodiment of a lighting device for illuminating operation switches installed on a steering wheel pad, according to the present invention.

PREFERRED EMBODIMENT OF THE INVENTION

Referring now to the drawing, the preferred embodiment of a lighting device for illuminating operation switches, according to the present invention, is described below. A steering wheel pad is installed on a steering wheel 10. The steering wheel may function as a horn switch 12. Otherwise, the horn switch 12 may also be installed on a steering spoke of the steering wheel. The horn switch 12 is connected to one end of a relay coil 14a of a horn relay 14 via a first slip ring 16. The other end of the relay coil 14a is connected to a power supply 18. The horn relay 14 comprises the relay coil 14a and a normally open contact 14b. One end of the normally open contact 14b is connected to the power supply 18 and the other end thereof is connected to a horn 20. In response to turning ON of the horn switch 12, electricity passes through the relay coil 14a, so that the normally open contact 14b is closed, thereby the horn 20 becomes active.

According to the present invention, the steering wheel pad has, for example, three operation holes and three operation switches, such as cruise control switches, for controlling an electric device other than the horn switch 12. The operation switches may be composed of a vehicular-speed increasing switch 22, a set switch 24 and a cancel switch 26 to control the electric device to perform constant-speed driving operation. The operation switches 22, 24 and 26 may be fixed at the bottom portion thereof to a steering wheel frame which is fixed to the upper end portion of a steering shaft. The top of each of the operation switches 22, 24 and 26 is preferably placed in the corresponding operation holes and separated from the front surface of the steering wheel pad by such a distance that the top of each of the operation switches 22, 24 and 26 does not protrude from the front surface of the steering wheel pad when the steering wheel pad is pushed to actuate the horn switch 12.

One terminal of each of the vehicular-speed increasing switch 22, the set switch 24 and the cancel switch 26 is connected to the first slip ring 16. The other terminals of the vehicular-speed increasing switch 22 and the set switch 24 are respectively connected to second and third slip rings 28 and 30. The other terminal of the cancel switch 26 is connected to the second and third slip rings 28 and 30 via diodes 32 and 34, respectively. The outputs of the second and third slip rings 28 and 30 are supplied to the electronic control circuit 36 which comprises a logic circuit 38, voltage discriminating circuits 40 and 42, and resistors 44 and 46. The second and third slip rings 28 and 30 are connected to input terminals of the voltage discriminating circuits 40 and 42, respectively. The input terminals of the voltage discriminating circuits 40 and 42 are also connected to ground via the respective resistors 44 and 46, so that voltages applied to the input terminals of the voltage discriminating circuit 40 and 42 are usually 0 V. The resistors 44 and 46 have respectively large resistance values so that the horn relay 14 does not become turned ON when the vehicular-speed increasing switch 22 and the set switch 24 are turned ON. The output terminals of the voltage discriminating circuits 40 and 42 are connected to the logic circuit 38.

When the vehicular-speed increasing switch 22 or the set switch is turned ON, voltage essentially equal to that of the power supply 18, e.g. 12 V of voltage is applied to the input terminal of the corresponding voltage discriminating circuit 40 or 42. As a result, the voltage discriminating circuit 40 or 42 is turned ON to produce a given output signal to supply the latter to the logic circuit 38. In accordance with this output signal, the logic circuit 38 performs constant-speed operation, by which the vehicle may drive at a predetermined speed, in such a manner as well known. On the other hand, when the cancel switch 26 is turned ON, both the voltage discriminating circuits 40 and 42 are turned ON, so that constant-speed driving operation is cancelled.

According to the present invention, a light-emitting diode 48 for illuminating the operation switches 22, 24 and 26 is installed on the steering wheel 10. The anode electrode of the light-emitting diode 48 is connected to the third slip ring 30 and the cathode electrode thereof is connected to ground via resistors 50 and 52 which have resistance values $R_L$ and $R_C$, respectively. In order to cause the light-emitting diode 48 to be turned ON, one terminal of a constant-voltage generator 54 is connected to the third slip ring 30 on the opposite side to the light-emitting diode 48. The other terminal thereof is connected to the power supply 18 via a light switch 56. The constant-voltage generator 54 applies voltage $V_L$, which is lower than threshold voltage of the voltage discriminating circuit 42 and which is enough to cause the light-emitting diode 48 to be turned ON, to the third slip ring 30 when the light switch 56 is turned ON. In addition, an instrument light 58 for illuminating the instrument panel is connected to the power supply 18 via the light switch 56. Furthermore, a Zener diode 60 is connected in parallel to the light-emitting diode 48. The cathode of the Zener diode 60 is connected to the third slip ring 30 and the anode thereof is connected, via a resistor 62, to the connecting point P between the resistors 50 and 52. The Zener diode 60 is turned ON when voltage applied to the third slip ring 30 is higher than threshold voltage of the voltage discriminating circuit 42, i.e. when the set switch 24 or the cancel switch 26 is closed. When the Zener diode 60 is turned ON, electricity runs through the Zener diode 60 and the resistors 62 and 52, so that power supply voltage is not directly supplied to the light-emitting diode 48.

In this construction, when the light switch 56 is turned ON, the instrument light 58 is turned on and simultaneously power supply voltage is applied to the constant-voltage generator 54. At this time, the constant-voltage generator 54 produces voltage $V_L$ which is lower than threshold voltage $V_S$ of the voltage discriminating circuit 42 to apply the voltage $V_L$ to the third slip ring 30. Since $V_S > V_L$, even if the voltage $V_L$ is supplied to the third slip ring 30, the output of the voltage discriminating circuit 42 is produced and the logic circuit 38 for controlling the vehicular speed at a predetermined value does not become active. The voltage $V_L$ supplied to the third slip ring 30 is applied to the light-emitting diode, so that electric current $i_L$ runs through the light-emitting diode 48 and the resistors 50 and 52, thereby the light emitting diode 48 is turned ON. The electrical current $i_L$ must be enough to cause the light-emitting diode 48 to be turned ON. Therefore, the resistance values $R_L$ and $R_C$ are determined by the following formula:

$$R_L + R_C = V_L / i_L \tag{1}$$

As mentioned above, when the light switch 56 is turned ON, the instrument light 58 mounted on the instrument panel is turned ON and simultaneously the light-emitting diode 48 is turned ON, so that it may illuminate the operation switches 22, 24 and 26 installed on the steering wheel 10.

When the set switch 24 or the cancel switch 26 is turned ON, power voltage of the power supply 4 is directly applied to the third slip ring 30. At this time, the Zener diode 60 is turned ON, so that electricity runs through the Zener diode 60 and the resistors 62 and 52. When electricity runs through the resistor 52, voltage at the connecting point P between the resistors 50 and 52 is increased. In this case, if it is assumed that the voltage at the connecting point is $V_P$ and the voltage of the power supply 18 is $V_O$, electrical current running through the light-emitting diode 48 is expressed by the following formula:

$$V_P = V_O - i_L R_L \tag{2}$$

Therefore, since electrical current $i_L$ is decreased by $V_P/R_L$, it is possible to prevent the light-emitting diode 48 from being destroyed when the set switch 24 or the cancel switch 26 is turned ON. As a result, the light-emitting diode 48 may be normally turned ON when the operation switch 24 or 26 is turned ON.

In order to obtain the optimum current $i_L$ determined by the formula (2), each of the resistance values $R_L$, $R_C$ and $R_T$ of the resistors 50, 52 and 62 may be determined by the following formula:

$$R_L + R_C R_C R_L / R_T = V_O / i_L \tag{3}$$

As mentioned above, according to the present invention, it is possible to illuminate operation switches 22, 24 and 26 mounted on the steering wheel 10 in response to turning ON of the light switch 56, the set switch 24 or the cancel switch 26 without providing any additional slip rings.

A lighting device of the present invention may be also used in cases where the operation switches are in communication with the electrical device, such as cruise control switches, audio control switches and so forth, by means of, for example, a light communication system or an optical fiber. In this case, the slip rings are not required for connecting the operation switches to the electrical device.

What is claimed is:

1. A lighting device for a switch arrangement mounted on an automotive steering wheel, comprising:
    an electrically operable load powered at a predetermined first level of power supplied through a power supply circuit;
    a first switch mounted on a steering wheel assembly and disposed within said power supply circuit, for commanding operation of said electric load when the first switch is manually operated;
    a lighting element mounted on said steering wheel assembly and associated with said first switch for lighting the first switch when the lighting element is illuminated, said lighting element being illuminated at a predetermined second level of power which is lower than said first level of power;
    a second switch for commanding lighting of said lighting element of illuminating said first switch;
    a first power source of said power supply circuit for supplying said first level of power;
    a second power source of said power supply circuit for supplying said second level of power and;
    a common electric coupling means associated with said steering wheel assembly and commonly connected to said first and said second switches and said first and said second power sources, for supplying said second level of power to said lighting element upon said second switching operation and supplying said first level of power to said load when said first switch is operated.

2. A lighting device for a switch arrangement mounted on an automotive steering wheel, comprising:
    an electrically operable load powered at a predetermined first level of power supplied through a power supply circuit;
    a first switch mounted on a steering wheel assembly and disposed within said power supply circuit, for commanding operation of said electric load when the first switch is manually operated;
    a lighting element mounted on said steering wheel assembly and associated with said first switch for lighting the first switch when the ligting element is illuminated, said lighting element being illuminated at a predetermined second level of power which is lower than said first level of power;
    a second switch for commanding lighting of said lighting element for illuminating said first switch;
    power source of said power supply circuit for generating said second level of power in response to operation of said second switch and generating said first level of power in response to operation of said first switch and;
    an electric coupling means associated with said steering wheel assembly and connected to said first and said second switches and said power source, for supplying said second level of power to said lighting element upon said second switching operation and supplying said first level of power to said load when said first switch is operated.

* * * * *